US008604937B2

(12) United States Patent
Owens et al.

(10) Patent No.: US 8,604,937 B2
(45) Date of Patent: Dec. 10, 2013

(54) TELEMATICS UNIT AND METHOD FOR CONTROLLING TELEMATICS UNIT FOR A VEHICLE

(75) Inventors: Kevin W. Owens, Sterling Heights, MI (US); Daniel C. McGarry, Oxford, MI (US); Nicholas J. Peariso, Pleasant Ridge, MI (US); Kevin R. Krause, Plymouth, MI (US); Russell A. Patenaude, Macomb Township, MI (US)

(73) Assignee: General Motors LLC, Detroit, MI (US)

( * ) Notice: Subject to any disclaimer, the term of this patent is extended or adjusted under 35 U.S.C. 154(b) by 293 days.

(21) Appl. No.: 12/845,822

(22) Filed: Jul. 29, 2010

(65) Prior Publication Data

US 2012/0026010 A1 Feb. 2, 2012

(51) Int. Cl.
*G08B 21/00* (2006.01)
(52) U.S. Cl.
USPC ...................................... 340/636.15; 340/438
(58) Field of Classification Search
USPC .......................... 340/988, 438, 636.15; 701/1
See application file for complete search history.

(56) References Cited

U.S. PATENT DOCUMENTS

| 4,882,565 | A | 11/1989 | Gallmeyer |
| 5,798,688 | A | 8/1998 | Schofield |
| 6,019,475 | A | 2/2000 | Lynam et al. |
| 6,087,953 | A | 7/2000 | DeLine et al. |
| 6,172,613 | B1 | 1/2001 | DeLine et al. |
| 6,329,925 | B1 | 12/2001 | Skiver et al. |
| 6,366,213 | B2 | 4/2002 | DeLine et al. |
| 6,428,172 | B1 | 8/2002 | Hutzel et al. |
| 6,501,387 | B2 | 12/2002 | Skiver et al. |
| 6,505,100 | B1 | 1/2003 | Stuempfle et al. |
| 6,520,667 | B1 | 2/2003 | Mousseau |
| 6,549,793 | B1 | 4/2003 | Baratono |
| 6,633,647 | B1 | 10/2003 | Markow et al. |
| 6,654,669 | B2 | 11/2003 | Eisenmann et al. |
| 6,690,268 | B2 | 2/2004 | Schofield et al. |
| 6,756,912 | B2 | 6/2004 | Skiver et al. |
| 6,889,064 | B2 | 5/2005 | Baratono et al. |
| 6,902,284 | B2 | 6/2005 | Hutzel et al. |
| 6,906,632 | B2 | 6/2005 | DeLine et al. |
| 6,993,351 | B2 | 1/2006 | Fraser et al. |
| 7,012,727 | B2 | 3/2006 | Hutzel et al. |
| 7,075,511 | B1 | 7/2006 | Mousseau et al. |
| 7,142,810 | B2 | 11/2006 | Oesterling |

(Continued)

OTHER PUBLICATIONS

Oesterling, C.L., et al. "Aftermarket Telematics Unit for Use With a Vehicle," U.S. Appl. No. 12/845,848, filed Jul. 29, 2010.

(Continued)

*Primary Examiner* — Joseph Chang

(57) ABSTRACT

A telematics unit is provided for a vehicle having a power unit, along with a method for controlling a telematics unit for a vehicle. The telematics unit includes a voltage sensor, a global positioning system unit, and a processor. The voltage sensor senses a measure of a voltage of the power unit. The global positioning system unit obtains position data as to a position of the vehicle. The processor is coupled to the voltage sensor and the global positioning system unit. The processor is configured to determine whether the voltage for the power unit has decreased using the sensed measure of the voltage, determine whether the vehicle is moving using the position data, and command the telematics unit to an off mode if the voltage has decreased and the vehicle is not moving.

20 Claims, 3 Drawing Sheets

(56) References Cited

U.S. PATENT DOCUMENTS

| | | | |
|---|---|---|---|
| 7,171,187 B2 * | 1/2007 | Haave et al. .............. 455/404.2 |
| 7,171,226 B2 | 1/2007 | Crocker et al. |
| 7,257,426 B1 | 8/2007 | Witkowski et al. |
| 7,293,888 B2 | 11/2007 | Hutzel et al. |
| 7,299,076 B2 | 11/2007 | Dunn, Jr. et al. |
| 7,308,341 B2 | 12/2007 | Schofield et al. |
| 7,346,374 B2 | 3/2008 | Witkowski et al. |
| 7,349,722 B2 | 3/2008 | Witkowski et al. |
| 7,372,818 B2 | 5/2008 | Fraser et al. |
| 7,395,096 B2 | 7/2008 | Baratono et al. |
| 7,474,942 B2 | 1/2009 | Patenaude |
| 7,488,080 B2 | 2/2009 | Skiver et al. |
| 7,526,367 B2 | 4/2009 | Schofield et al. |
| 7,651,228 B2 | 1/2010 | Skiver et al. |
| 7,657,052 B2 | 2/2010 | Larson et al. |
| 7,690,824 B2 | 4/2010 | Uken et al. |
| 7,711,479 B2 | 5/2010 | Taylor et al. |
| 7,734,392 B2 | 6/2010 | Schofield et al. |
| 7,904,023 B2 | 3/2011 | Viitamäki et al. |
| 7,970,446 B2 | 6/2011 | Witkowski et al. |
| 8,194,133 B2 | 6/2012 | Dewind et al. |
| 2002/0197955 A1 | 12/2002 | Witkowski et al. |
| 2003/0001734 A1 | 1/2003 | Schofield et al. |
| 2003/0020603 A1 | 1/2003 | DeLine et al. |
| 2003/0102688 A1 | 6/2003 | Bingle et al. |
| 2003/0117728 A1 | 6/2003 | Hutzel et al. |
| 2003/0191583 A1 | 10/2003 | Uhlmann et al. |
| 2004/0127206 A1 | 7/2004 | Van Bosch et al. |
| 2004/0145457 A1 | 7/2004 | Schofield et al. |
| 2004/0160313 A1 | 8/2004 | McCarthy et al. |
| 2004/0165293 A1 | 8/2004 | Whitehead |
| 2004/0203379 A1 | 10/2004 | Witkowski et al. |
| 2004/0209655 A1 | 10/2004 | Kubo |
| 2004/0267419 A1 | 12/2004 | Jeng |
| 2005/0023858 A1 | 2/2005 | Bingle et al. |
| 2005/0032550 A1 | 2/2005 | Baratono et al. |
| 2005/0040941 A1 | 2/2005 | Schofield et al. |
| 2005/0156714 A1 | 7/2005 | McCarthy et al. |
| 2005/0156753 A1 | 7/2005 | DeLine et al. |
| 2006/0035590 A1 | 2/2006 | Morris et al. |
| 2006/0220817 A1 | 10/2006 | Schofield et al. |
| 2006/0261932 A1 | 11/2006 | Ando et al. |
| 2006/0290518 A1 | 12/2006 | Bingle et al. |
| 2007/0002477 A1 | 1/2007 | Whitehead |
| 2007/0047753 A1 | 3/2007 | Watson et al. |
| 2007/0058821 A1 | 3/2007 | Welsh et al. |
| 2007/0109807 A1 | 5/2007 | Lynam et al. |
| 2007/0118280 A1 | 5/2007 | Uhlmann et al. |
| 2007/0132567 A1 | 6/2007 | Schofield et al. |
| 2007/0171037 A1 | 7/2007 | Schofield et al. |
| 2008/0045274 A1 | 2/2008 | Witkowski et al. |
| 2008/0080076 A1 | 4/2008 | Hutzel et al. |
| 2008/0137895 A1 | 6/2008 | Gratke et al. |
| 2008/0174414 A1 | 7/2008 | McCarthy et al. |
| 2008/0186724 A1 | 8/2008 | Lynam et al. |
| 2008/0212215 A1 | 9/2008 | Schofield et al. |
| 2008/0225538 A1 | 9/2008 | Lynam et al. |
| 2008/0266389 A1 | 10/2008 | DeWind et al. |
| 2008/0300779 A1 | 12/2008 | Uhlmann et al. |
| 2009/0005136 A1 | 1/2009 | Hutzel et al. |
| 2009/0097674 A1 | 4/2009 | Watson et al. |
| 2009/0134606 A1 | 5/2009 | Schofield et al. |
| 2009/0208058 A1 | 8/2009 | Schofield et al. |
| 2009/0232328 A1 | 9/2009 | DeLine et al. |
| 2009/0284391 A1 | 11/2009 | Berkobin et al. |
| 2009/0290369 A1 | 11/2009 | Schofield et al. |
| 2009/0318084 A1 | 12/2009 | McCarthy et al. |
| 2010/0045790 A1 | 2/2010 | Lynam et al. |
| 2010/0045797 A1 | 2/2010 | Schofield et al. |
| 2010/0188508 A1 | 7/2010 | McMahon et al. |
| 2011/0227698 A1 | 9/2011 | Witkowski et al. |
| 2012/0005395 A1 | 1/2012 | Lydon et al. |
| 2012/0236152 A1 | 9/2012 | DeWind et al. |

OTHER PUBLICATIONS

Videtich, M.C., et al. "Vehicle Mirror and Telematics System," U.S. Appl. No. 12/851,025, filed Aug. 5, 2010.
Owens, K.W., et al. "Aftermarket Telematics System," U.S. Appl. No. 12/895,066, filed Sep. 30, 2010.
Peariso, N.J., et al. "Aftermarket Telematics Unit and Method for Installation Verification," U.S. Appl. No. 12/899,808, filed Oct. 7, 2010.
USPTO, U.S. "Non-Final Office Action" mailed Nov. 14, 2012 for U.S. Appl. No. 12/851,025, filed Aug. 5, 2010.
USPTO, U.S. "Non-Final Office Action" mailed Nov. 28, 2012 for U.S. Appl. No. 12/845,848, filed Jul. 29, 2010.
USPTO, Non-Final Office Action for U.S. Appl. No. 12/830,928, mailed Mar. 15, 2013.
USPTO, Notice of Allowance and Fee(s) Due for U.S. Appl. No. 12/845,848, mailed Mar. 28, 2013.
USPTO, Notice of Allowance and Fee(s) Due for U.S. Appl. No. 12/895,066, mailed May 31, 2013.
USPTO, Notice of Allowance and Fee(s) Due for U.S. Appl. No. 12/899,808, mailed Feb. 14, 2013.
USPTO, Final Office Action for U.S. Appl. No. 12/851,025, mailed Feb. 21, 2013.
USTPO, U.S. Non-Final Office Action mailed Jan. 18, 2013 for U.S. Appl. No. 12/895,066, filed Sep. 30, 2010.
German Patent and Trade Mark Office, Office Action in German Patent Application No. 10 2011 108 365.4, mailed May 3, 2013.
Chinese Patent and Trade Mark Office, Office Action for Chinese Patent Application No. 201110223613.8, mailed Sep. 26, 2013.

* cited by examiner

TELEMATICS UNIT AND METHOD FOR CONTROLLING TELEMATICS UNIT FOR A VEHICLE

TECHNICAL FIELD

The technical field generally relates to vehicles, and, more particularly, to telematics units and methods for controlling telematics units for a vehicle.

BACKGROUND

Many vehicles in the marketplace are equipped with telematics units. Certain telematics units are designed, constructed, and programmed to enable a user of the vehicle (hereinafter "user") to interact with a communications network. The communication network includes a remotely located call center (hereinafter "call center") staffed with live advisors (hereinafter "advisors") who are trained to provide assistance to the user. Through the communication network, a user may utilize a wide variety of telematics services that are designed to facilitate and/or enhance the user's driving and/or vehicle ownership experience. Such services may include, but are not limited to, navigation assistance, vehicle monitoring, and telecommunication services. These telematics services may be provided by a manufacturer of the vehicle, by a manufacturer of the telematics units, or by some other telematics service provider.

For many telematics units, it is desirable to have the units remain powered on only when the vehicle is in an operational state in which the vehicle may be operated by a user. However, in certain circumstances, for example in which the telematics unit is not connected to a communications bus of the vehicle, it may be difficult for the telematics unit to determine the operational state of the vehicle.

Accordingly, it is desirable to provide an improved method for controlling a telematics unit for a vehicle that commands the telematics unit between power on and power off operating modes, for example in situations in which the telematics unit is not connected to a communications bus of the vehicle. It is further desirable to provide an improved telematics unit that is commanded between power on and power off operating modes, for example in situations in which the telematics unit is not connected to a communications bus of the vehicle. Furthermore, other desirable features and characteristics of the present invention will become apparent from the subsequent detailed description and the appended claims, taken in conjunction with the accompanying drawings and the foregoing technical field and background.

SUMMARY

In accordance with one example, a method for controlling a telematics unit for a vehicle having a power unit is provided. The method comprises the steps of determining whether a voltage for the power unit has decreased, determining whether the vehicle is moving, and commanding the telematics unit to an off mode if the voltage has decreased and the vehicle is not moving.

In accordance with another example, a method for controlling a telematics unit for a vehicle having a power unit is provided. The method comprises the steps of sensing a measure of a voltage of the power unit, detecting a measure of movement of the vehicle, commanding the telematics unit to an off mode if the voltage has decreased by at least a first predetermined voltage amount and the vehicle is moving at least at a predetermined velocity for at least a predetermined amount of time as determined using the sensed measure of the voltage and the detected measure of movement, and commanding the telematics unit to an on mode if the voltage has increased by at least a second predetermined voltage amount as determined using the sensed measure of the voltage.

In accordance with a further example, a telematics unit is provided for a vehicle having a power unit. The telematics unit comprises a voltage sensor, a global positioning system unit, and a processor. The voltage sensor is configured to sense a measure of a voltage of the power unit. The global positioning system unit is configured to detect a measure of movement of the vehicle. The processor is coupled to the voltage sensor and the global positioning system unit. The processor is configured to determine whether the voltage for the power unit has decreased using the sensed measure of the voltage, determine whether the vehicle is moving using the detected measure of movement, and command the telematics unit to an off mode if the voltage has decreased and the vehicle is not moving.

BRIEF DESCRIPTION OF THE DRAWINGS

Certain examples of the present disclosure will hereinafter be described in conjunction with the following drawing figures, wherein like numerals denote like elements, and wherein.

DETAILED DESCRIPTION

The following detailed description is merely exemplary in nature, and is not intended to limit the disclosure or the application and uses thereof. Furthermore, there is no intention to be bound by any expressed or implied theory presented in the preceding technical field, background, or the following detailed description.

Figure 1:
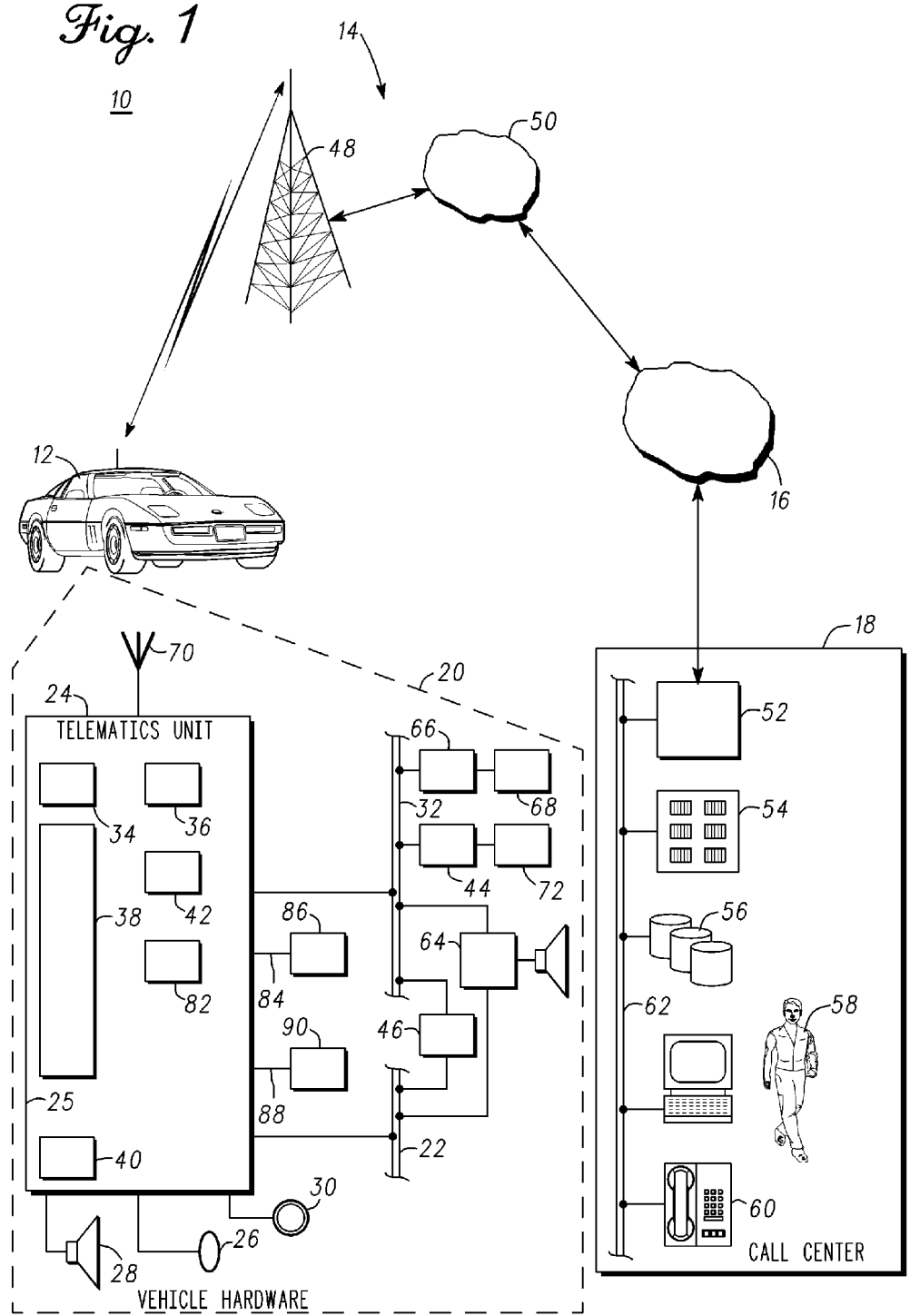
FIG. 1 is an exemplary schematic illustration of a non-limiting example of a communication system and a telematics unit having a power on and off feature that may be used together with the communication system.

With reference to FIG. 1, there is shown a non-limiting example of a communication system 10 that may be used together with examples of the apparatus disclosed herein and to implement examples of the methods disclosed herein. The communication system generally includes a vehicle 12, a wireless carrier system 14, a land network 16, and a call center 18. It should be appreciated that the overall architecture, setup and operation, as well as the individual components of the illustrated system are merely exemplary and that differently configured communication systems may also be utilized to implement the examples of the method disclosed herein. Thus, the following paragraphs, which provide a brief overview of the illustrated communication system 10, are not intended to be limiting.

Vehicle 12 may be any type of mobile vehicle such as a motorcycle, car, truck, recreational vehicle (RV), boat, plane, and the like, and is equipped with suitable hardware and software that enables it to communicate over communication system 10. Some of the vehicle hardware 20 is shown generally in FIG. 1 including a telematics unit 24, a microphone 26, a speaker 28, and buttons and/or controls 30 connected to the telematics unit 24. Operatively coupled to the telematics unit 24 is a network connection or vehicle bus 32. Examples of suitable network connections include a controller area network (CAN), a media oriented system transfer (MOST), a local interconnection network (LIN), an Ethernet, and other appropriate connections such as those that conform with known ISO (International Organization for Standardization), SAE (Society of Automotive Engineers), and/or IEEE (Institute of Electrical and Electronics Engineers) standards and specifications, to name a few.

The telematics unit 24 is an onboard device that provides information or other functions, such as those described further below. In the depicted example, the telematics unit 24 is an onboard device that provides a variety of services through its communication with the call center 18. In certain other examples, the telematics unit 24 may comprise a stand-alone navigation device and/or another type of telematics unit that may not require the call center and/or certain other features of the communication system 10.

In the depicted example, the telematics unit 24 generally includes a housing 25, an electronic processing device 38, one or more types of electronic memory 40, a cellular chipset/component 34, a wireless modem 36, a dual mode antenna 70, a navigation unit containing a GPS chipset/component 42, and one or more voltage sensors 82. The electronic processing device 38, the one or more types of electronic memory 40, the cellular chipset/component 34, the wireless modem 36, the navigation unit containing the GPS chipset/component 42, and the one or more voltage sensors 82 are preferably disposed within the housing 25. In one example, the wireless modem 36 includes a computer program and/or set of software routines adapted to be executed within the electronic processing device 38.

The telematics unit 24 may provide various services including: turn-by-turn directions and other navigation-related services provided in conjunction with the GPS chipset/component 42; airbag deployment notification and other emergency or roadside assistance-related services provided in connection with various crash and/or collision sensor interface modules 66 and collision sensors 68 located throughout the vehicle; and/or infotainment-related services where music, internet web pages, movies, television programs, videogames, and/or other content are downloaded by an infotainment center 46 operatively connected to the telematics unit 24 via vehicle bus 32 and audio bus 22. In one example, downloaded content is stored for current or later playback. The above-listed services are by no means an exhaustive list of all the capabilities of telematics unit 24, but are simply an illustration of some of the services that the telematics unit 24 may be capable of offering. It is anticipated that telematics unit 24 may include a number of additional components in addition to and/or different components from those listed above.

In the depicted example, the telematics unit 24 also includes a first connector 84 and a second connector 88. The first connector 84 comprises a connector (for example, a cable or wire) configured to be electrically connected to a vehicle power unit 86. In one example, the vehicle power unit 86 comprises a vehicle battery, such as a twelve volt vehicle battery. The second connector 88 comprises a connector (for example, a cable or wire) configured to be electrically connected to a vehicle ground unit 90. In certain examples, the telematics unit 24 may be connected or coupled to the vehicle only via the first and second connectors 84, 88. For example, the telematics unit 24 may not be coupled to the vehicle bus 32.

In certain examples, the first connector 84 comprises a voltage supply line that is powered by a vehicle battery when the vehicle is off and by an alternator when the vehicle is on. Such a voltage supply line is sometimes referred to in the industry as a twelve volt supply bus. In this example, the vehicle power unit 86 may include both a battery and an alternator. When the vehicle is in an off state, the voltage supply line voltage is less than thirteen volts. Conversely, when the vehicle is in an on state, the voltage supply line voltage is greater than thirteen volts.

The voltage sensors 82 are configured to sense a voltage of the vehicle power unit 86 of the vehicle at various points in time (for example, as provided over the first connection 84). In certain examples, the voltage sensors 82 may be part of and/or disposed within the electronic processing device 38. In certain other examples, the voltage sensors 82 provide signals and/or information to the electronic processing device 38 representative of the voltage of the vehicle power unit 86.

The electronic processing device 38 processes the voltage signals and/or information pertaining thereto for use in determining whether a voltage drop or a voltage increase has occurred. The electronic processing device 38 also uses information or signals obtained from the GPS chipset/component 42 for use in determining whether the vehicle is currently moving, a velocity of the vehicle movement, durations of time for such movement, and related determinations. The electronic processing device 38 uses these various determinations regarding the vehicle power unit voltage and the vehicle movement in optimally commanding the telematics unit 24 between on and off operating modes based on whether the vehicle is in an operational state in which the vehicle may be operated by a user, for example in accordance with the steps of the process 200 described further below in connection with FIGS. 2-4.

Vehicle communications may use radio transmissions to establish a voice channel with wireless carrier system 14 so that both voice and data transmissions can be sent and received over the voice channel. Vehicle communications are enabled via the cellular chipset/component 34 for voice communications and the wireless modem 36 for data transmission. In order to enable successful data transmission over the voice channel, wireless modem 36 applies some type of encoding or modulation to convert the digital data so that it can be communicated through a vocoder or speech codec incorporated in the cellular chipset/component 34. Any suitable encoding or modulation technique that provides an acceptable data rate and bit error can be used with the present examples. Dual mode antenna 70 services the GPS chipset/component 42 and the cellular chipset/component 34.

Microphone 26 provides the user or other vehicle occupant with a means for inputting verbal or other auditory commands, and can be equipped with an embedded voice processing unit utilizing a human/machine interface (HMI) technology known in the art. Conversely, speaker 28 provides audible output to the vehicle occupants and can be either a stand-alone speaker specifically dedicated for use with the telematics unit 24 or can be part of a vehicle audio component 64. In either event, microphone 26 and speaker 28 enable vehicle hardware 20 and call center 18 to communicate with the occupants through audible speech. The vehicle hardware also includes one or more buttons and/or controls 30 for enabling a vehicle occupant to activate or engage one or more of the vehicle hardware 20 components. For example, one of the buttons and/or controls 30 can be an electronic pushbutton used to initiate voice communication with call center 18 (whether it be a human such as advisor 58 or an automated call response system). In another example, one of the buttons and/or controls 30 can be used to initiate emergency services.

The audio component 64 is operatively connected to the vehicle bus 32 and the audio bus 22. The audio component 64 receives analog information, rendering it as sound, via the audio bus 22. Digital information is received via the vehicle bus 32. The audio component 64 provides amplitude modulated (AM) and frequency modulated (FM) radio, compact disc (CD), digital video disc (DVD), and multimedia functionality independent of the infotainment center 46. Audio component 64 may contain a speaker system, or may utilize speaker 28 via arbitration on vehicle bus 32 and/or audio bus 22.

The vehicle crash and/or collision detection sensor interface 66 is operatively connected to the vehicle bus 32 or directly connected to the telematics unit 24. The collision sensors 68 provide information to the telematics unit 24 via the crash and/or collision detection sensor interface 66 regarding the severity of a vehicle collision, such as the angle of impact and the amount of force sustained.

Vehicle sensors 72, connected to various sensor interface modules 44 are operatively connected to the vehicle bus 32. Example vehicle sensors include but are not limited to gyroscopes, accelerometers, magnetometers, emission detection, and/or control sensors, and the like. Example sensor interface modules 44 include powertrain control, climate control, and body control, to name but a few.

Wireless carrier system 14 may be a cellular telephone system or any other suitable wireless system that transmits signals between the vehicle hardware 20 and land network 16. According to an example, wireless carrier system 14 includes one or more cell towers 48, base stations and/or mobile switching centers (MSCs) 50, as well as any other networking components required to connect the wireless carrier system 14 with land network 16. As appreciated by those skilled in the art, various cell tower/base station/MSC arrangements are possible and could be used with wireless carrier system 14. For example, a base station and a cell tower could be co-located at the same site or they could be remotely located, and a single base station could be coupled to various cell towers or various base stations could be coupled with a single MSC, to list but a few of the possible arrangements. A speech codec or vocoder may be incorporated in one or more of the base stations, but depending on the particular architecture of the wireless network, it could be incorporated within a Mobile Switching Center or some other network components as well.

Land network 16 can be a conventional land-based telecommunications network that is connected to one or more landline telephones, and that connects wireless carrier system 14 to call center 18. For example, land network 16 can include a public switched telephone network (PSTN) and/or an Internet protocol (IP) network, as is appreciated by those skilled in the art. Of course, one or more segments of the land network 16 can be implemented in the form of a standard wired network, a fiber or other optical network, a cable network, other wireless networks such as wireless local networks (WLANs) or networks providing broadband wireless access (BWA), or any combination thereof.

Call center 18 is designed to provide the vehicle hardware 20 with a number of different system back-end functions and, according to the example shown here, generally includes one or more switches 52, servers 54, databases 56, advisors 58, as well as a variety of other telecommunication/computer equipment 60. These various call center components are suitably coupled to one another via a network connection or bus 62, such as the one previously described in connection with the vehicle hardware 20. Switch 52, which can be a private branch exchange (PBX) switch, routes incoming signals so that voice transmissions are usually sent to either the live advisor 58 or an automated response system, and data transmissions are passed on to a modem or other piece of telecommunication/computer equipment 60 for demodulation and further signal processing. The modem or other telecommunication/computer equipment 60 may include an encoder, as previously explained, and can be connected to various devices such as a server 54 and database 56. For example, database 56 could be designed to store subscriber profile records, subscriber behavioral patterns, or any other pertinent subscriber information. Although the illustrated example has been described as it would be used in conjunction with a manned call center 18, it will be appreciated that the call center 18 can be any central or remote facility, manned or unmanned, mobile or fixed, to or from which it is desirable to exchange voice and data. In addition, in certain examples, the telematics unit 24 may not use or require a call center and/or various other features set forth in FIG. 1 or described above.

Figure 2:
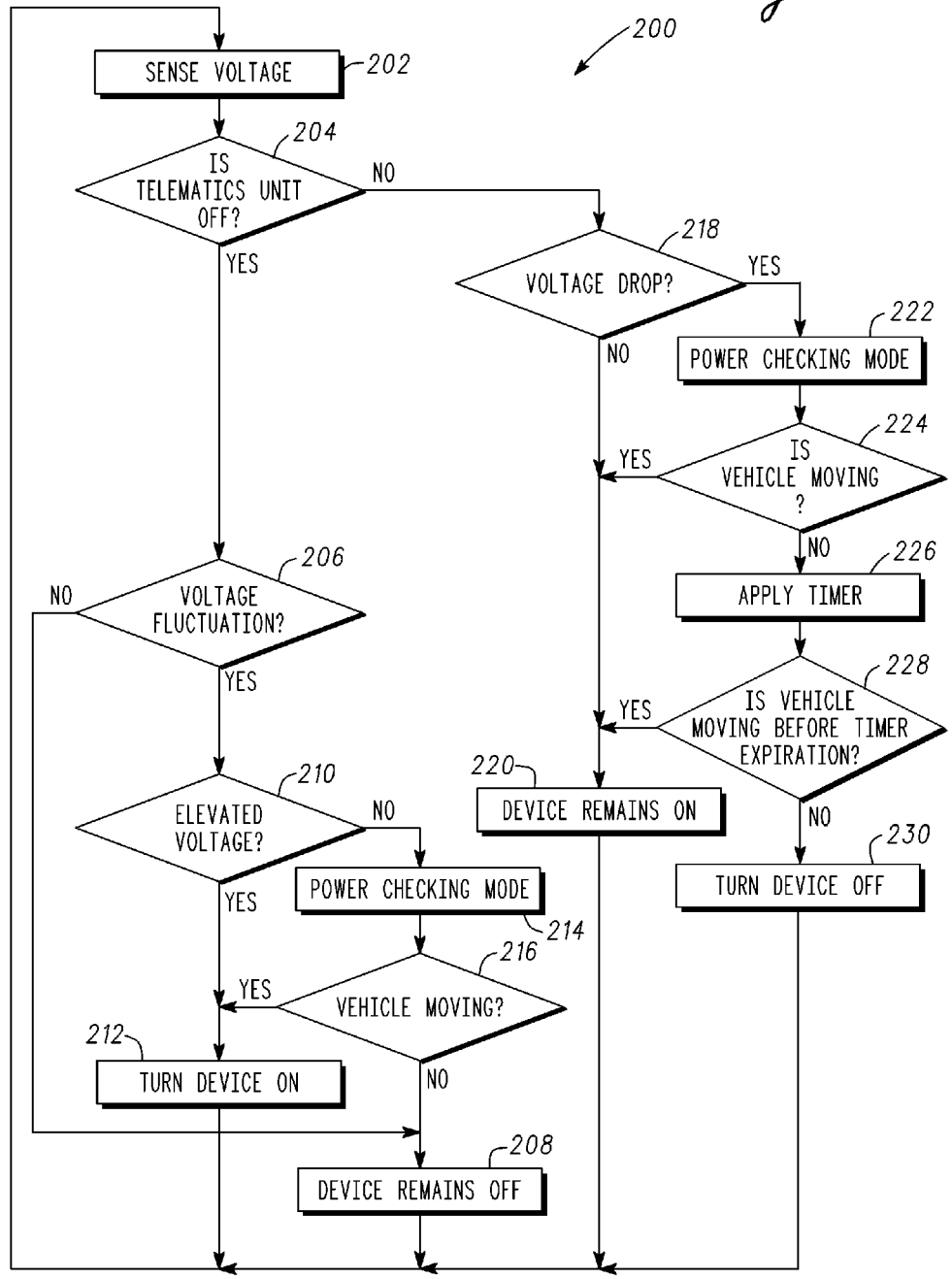
FIG. 2 is a flowchart of an exemplary process for powering a telematics unit on and off, and that can be implemented in connection with the telematics unit of FIG. 1.
Figure 3:
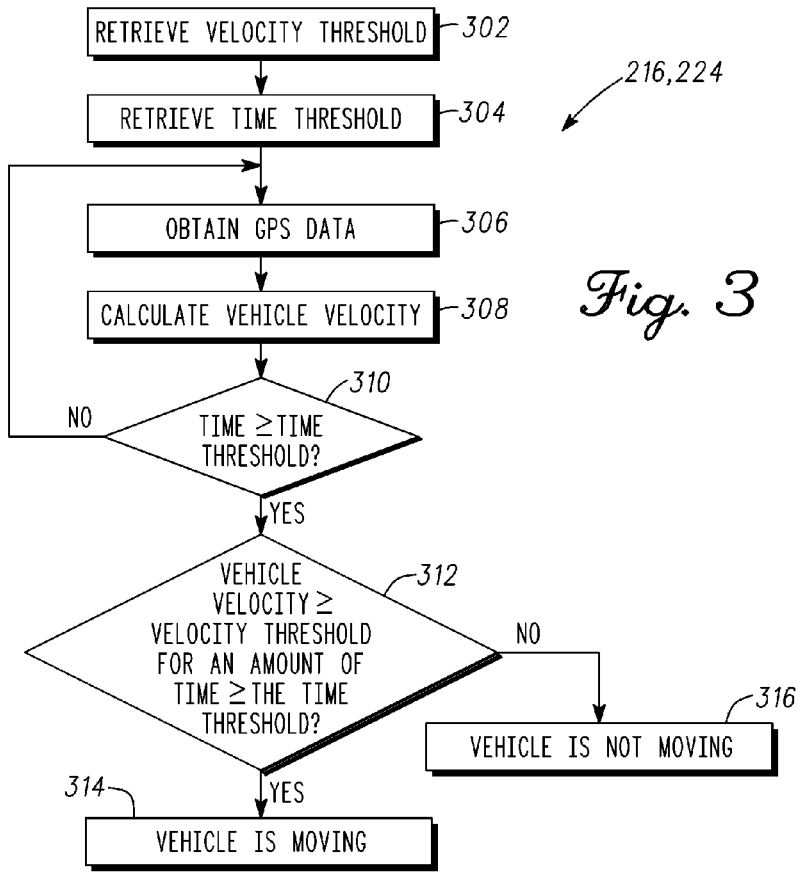
FIG. 3 is a flowchart of an exemplary sub-process for the process of FIG. 1, namely the sub-process of determining whether a vehicle is moving.
Figure 4:
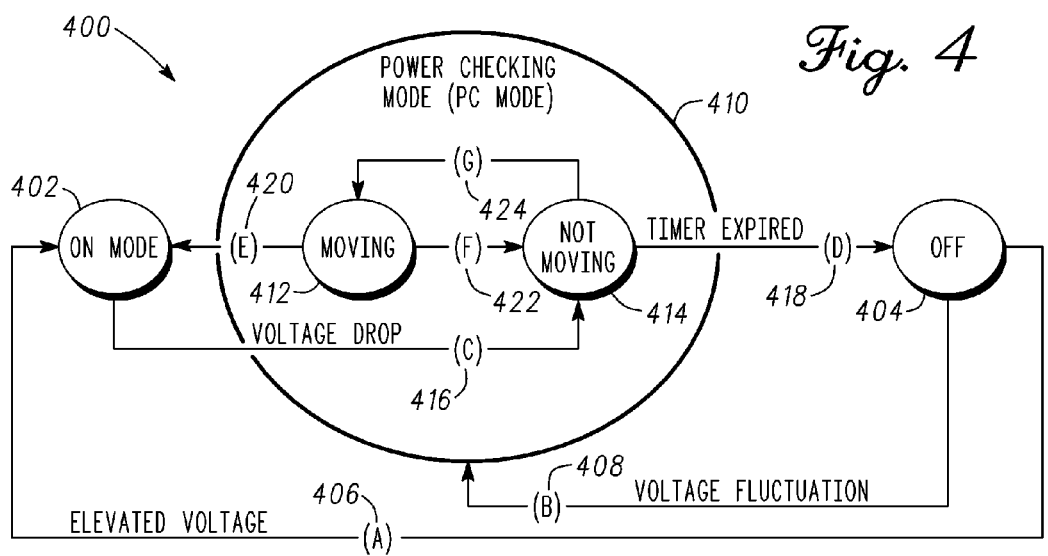
FIG. 4 is an exemplary flowchart of various stages of the process of FIG. 2.

FIG. 2 is a flowchart of an exemplary process 200 for controlling a power mode of a telematics unit of a vehicle. The process 200 may be implemented in connection with the telematics unit 24 of FIG. 1 and/or in connection with other telematics units. The process 200 will be described below with reference to FIG. 2 as well as FIGS. 3 and 4. FIG. 3 provides a flowchart of an exemplary sub-process of certain steps of the process 200 (namely, determining whether the vehicle is moving, as described below in connection with steps 216 and 224 of FIG. 2). FIG. 4 provides an exemplary flowchart 400 of various stages of the process 200.

As depicted in FIG. 2, the process 200 includes the step of sensing a voltage of a power source of the vehicle (step 202). In one example, during step 202, the one or more voltage sensors 82 of FIG. 1 sense voltage of the vehicle power unit 86 (for example, a twelve volt battery) of FIG. 1 along the first connector 84 of FIG. 1. The voltage readings (and/or signals or other information pertaining thereto) are processed by the electronic processing device 38 of FIG. 1.

A determination is made as to whether the telematics unit is currently in an off mode (step 204). The off mode, as used throughout this application, preferably represents an operating mode in which most or all of the features of the telematics unit are not operating or have been disabled or powered off. In certain examples, the off mode may signify a sleep mode or a reduced power consumption mode, in which certain functions may be powered off or temporarily disabled, while other functions may be operating or powered on. For example, in certain examples, the telematics unit may still be able to receive calls or await instructions and/or provide certain other functions even though the telematics unit may be deemed to be in an off mode because other functions (such as those used by the user while driving, by way of example) are powered off or temporarily disabled. By contrast, an on mode preferably represents an operating mode in which most or all of the features of the telematics unit are operating or have been enabled or powered on. With reference to FIG. 4, the on mode is represented by stage 402, and the off mode is represented by stage 404.

The determination of step 202 is preferably made by the electronic processing device 38 of FIG. 1. The electronic processing device 38 may make this determination based on information stored in the electronic memory 40 of FIG. 1 as to a prior iteration of the process 200. Alternatively, the electronic processing device 38 may make this determination based on other information pertaining to the operation of the telematics unit 24.

If it is determined that the telematics unit is currently in an off mode, then a determination is made as to whether there has been a recent voltage fluctuation (step 206). Preferably this comprises a determination as to whether there has been a voltage fluctuation since the most previous iteration. This determination is preferably made by the electronic processing device 38 of FIG. 1 using information or signals as to the voltage sensed in step 202. In one example, a voltage fluctuation is determined to occur if the voltage sensed in step 202 represents a change in voltage that is greater than a predetermined amount in absolute magnitude, such as one volt, by way of example only. In another example, a voltage fluctuation is determined to occur if the voltage sensed in step 202 represents a change in voltage that is greater than a predetermined percentage, such as twenty percent, by way of example only.

If it is determined that a voltage fluctuation has not occurred, then the telematics unit remains in the off mode (step 208). Specifically, the electronic processing device 38 of FIG. 1 preferably does not issue any commands for the telematics unit to change to the on mode if there is no voltage fluctuation. The process then returns to step 202, as the voltage is sensed again at a new point in time for a new iteration and the process repeats.

Conversely, if it is determined that a voltage fluctuation has occurred, then a determination is made as to whether there has been a recent voltage elevation (step 210). Preferably this comprises a determination as to whether there has been a voltage elevation since the most previous iteration. This determination is preferably made by the electronic processing device 38 of FIG. 1 using information or signals as to the voltage sensed in step 202. In one example, a voltage elevation is determined to occur if the voltage sensed in step 202 represents an increase in voltage that is greater than a predetermined amount in absolute magnitude, such as one volt, by way of example only. In another example, a voltage elevation is determined to occur if the voltage sensed in step 202 represents an increase in voltage that is greater than a predetermined percentage, such as twenty percent, by way of example only.

If it is determined that a voltage elevation has occurred, then the telematics unit is commanded to the on mode of operation (step 212). The telematics unit is preferably commanded to the on mode of operation by the electronic processing device 38 of FIG. 1. With reference to FIG. 4, this command is provided in accordance with stage 406, in commanding the telematics unit to the on mode of stage 402. The process then returns to step 202, as the voltage is sensed again at a new point in time for a new iteration and the process repeats.

Conversely, if it is determined that a voltage elevation has not occurred, then the process enters a power checking mode (step 214). The power checking mode yields a determination as to whether the vehicle is in an on operational state in which the vehicle may be being operated by a user. With reference to FIG. 4, the power checking mode is denoted as stage 410, and the power checking mode is denoted as being entered due to the voltage fluctuation denoted in stage 408.

During the power checking mode, a determination is made as to whether the vehicle is moving (step 216). This preferably comprises a determination as to whether the vehicle has been moving at least at a predetermined velocity for at least a predetermined amount of time. This determination is preferably made by the electronic processing device 38 of FIG. 1.

With reference to FIG. 3, an exemplary flowchart of a sub-process is provided for the determination of step 216 of FIG. 2. The sub-process begins with the step of retrieving a velocity threshold (step 302). The velocity threshold preferably corresponds to a minimum velocity at which the vehicle can travel while moving. In one example, the velocity threshold is approximately five miles per hour. The velocity threshold is preferably stored in the electronic memory 40 of FIG. 1 for use by the electronic processing device 38 of FIG. 1.

A time threshold is also retrieved (step 304). The time threshold preferably corresponds to a minimum amount of time that the vehicle would need to be moving for a determination to be made that the vehicle is in an on operating mode. In one example, the time threshold is five seconds. The time threshold is preferably stored in the electronic memory 40 of FIG. 1 for use by the electronic processing device 38 of FIG. 1.

In addition, global positioning system (GPS) data is obtained (step 306). The GPS data preferably corresponds to data as to a geographic location of the vehicle over time. The GPS data is preferably obtained continuously by the GPS chipset/component 42 of FIG. 1 for use by the electronic processing device 38 of FIG. 1.

A vehicle velocity is calculated (step 308). The vehicle velocity is preferably calculated continuously by the electronic processing device 38 of FIG. 1 using the GPS data obtained from the GPS chipset/component 42 of FIG. 1 during step 306.

In addition, a determination is made as to whether the vehicle velocity has been calculated for an amount of time that is greater than or equal to the time threshold of step 304 (step 310). This determination is preferably made by the electronic processing device 38 of FIG. 1.

If it is determined that the vehicle velocity has not been calculated for an amount of time that is greater than or equal to the time threshold, then the process returns to step 306. Steps 306-310 then repeat, as the vehicle velocity is re-calculated using new, updated GPS data, until there is a determination in a subsequent iteration of step 310 that the vehicle velocity has been calculated for an amount of time that is greater than or equal to the time threshold.

Once it is determined in an iteration of step 310 that the vehicle velocity has been calculated for an amount of time that is greater than or equal to the time threshold, a determination is then made as to whether the vehicle velocity has been greater than or equal to the velocity threshold of step 302 for an amount of time that is greater than or equal to the time threshold (step 312). This determination is preferably made by the electronic processing device 38 of FIG. 1.

If it is determined that the vehicle velocity has been greater than or equal to the velocity threshold for an amount of time that is greater than or equal to the time threshold, then the vehicle is deemed to be moving (step 314). For example, in one example in which the velocity threshold is five miles per hour and the time threshold is five seconds, the vehicle will be deemed to be moving if the vehicle has been travelling with a velocity of at least five miles per hour for a duration of time of at least five seconds. With reference to FIG. 4, the determination that the vehicle is moving is denoted by stage 412.

Conversely, if it is determined that the vehicle velocity has not been greater than or equal to the velocity threshold for an amount of time that is greater than or equal to the time threshold, then the vehicle is deemed to be not moving (step 316). For example, in the above-described example in which the velocity threshold is five miles per hour and the time threshold is five seconds, the vehicle will be deemed to be not moving if the vehicle has not been travelling with a velocity of at least five miles per hour for a duration of time of at least five seconds. With reference to FIG. 4, the determination that the vehicle is not moving is denoted by stage 414. In addition, in certain examples in which the vehicle may be moving at one point in time and then ceases moving, the determination of the vehicle's movement may change from moving to not moving, as denoted by transition stage 422 of FIG. 4.

Returning now to FIG. 2, if it is determined in step 216 that the vehicle is moving, then the process proceeds to the above-referenced step 212, as the telematics unit is commanded to the on mode of operation. With reference to FIG. 4, this command is provided in accordance with stages 412 and 420, in commanding the telematics unit to the on mode of stage 402. The process then returns to step 202, as the voltage is sensed again at a new point in time for a new iteration and the process repeats.

Conversely, if it is determined in step 216 that the vehicle is not moving, then the process proceeds instead to the above-referenced step 208, as the telematics unit is commanded instead to remain in the off mode of operation. The process then returns to step 202, as the voltage is sensed again at a new point in time for a new iteration and the process repeats.

Returning now to step 204, if it is determined that the telematics unit is currently in an on mode, then a determination is made as to whether there has been a recent voltage drop (step 218). Preferably this comprises a determination as to whether there has been a voltage drop since the most previous iteration. This determination is preferably made by the electronic processing device 38 of FIG. 1 using information or signals as to the voltage sensed in step 202. In one example, a voltage drop is determined to occur if the voltage sensed in step 202 represents an initial decrease in voltage that is greater than a predetermined amount in absolute magnitude, such as one volt, followed by a more relatively smaller and more gradual additional decrease in voltage, by way of example only. In another example, a voltage drop is determined to occur if the voltage sensed in step 202 represents a decrease in voltage that is greater than a predetermined percentage, such as twenty percent, followed by a more relatively smaller and more gradual additional decrease in voltage, by way of example only.

If it is determined that a voltage drop has not occurred, then the telematics unit remains in the on mode (step 220). Specifically, the electronic processing device 38 of FIG. 1 preferably does not issue any commands for the telematics unit to change to the off mode if there is no voltage drop. The process then returns to step 202, as the voltage is sensed again at a new point in time for a new iteration and the process repeats.

Conversely, if it is determined that a voltage drop has occurred, then the process enters a power checking mode (step 222). The power checking mode yields a determination as to whether the vehicle is in an on operational state in which the vehicle may be being operated by a user. With reference to FIG. 4, this power checking mode, along with the power checking mode of step 214 (described above), are collectively denoted as state 410.

During the power checking mode, a determination is made as to whether the vehicle is moving (step 224). This preferably comprises a determination as to whether the vehicle has been moving at least a predetermined velocity for at least a predetermined amount of time. This determination is preferably made by the electronic processing device 38 of FIG. 1. The above-referenced exemplary flowchart of FIG. 3 also applies to the determination of step 224. Specifically, similar to step 216, the determination of whether the vehicle is moving in step 224 likewise is preferably determined using steps 302-316 of FIG. 3 (described above).

If it is determined in step 224 that the vehicle is moving, then the process proceeds to the above-referenced step 220, as the telematics unit is commanded to remain in the on mode of operation. The process then returns to step 202, as the voltage is sensed again at a new point in time for a new iteration and the process repeats.

Conversely, if it is determined in step 224 that the vehicle is not moving, then a timer is applied (step 226). The timer comprises waiting an amount of time equal to a predetermined timer threshold, and then recalculating the vehicle velocity at the expiration of the timer. Preferably the vehicle velocity is also calculated continuously during the timer period. The timer is preferably executed by the electronic processing device 38 of FIG. 1. The timer preferably expires after an amount of time, such that, if the vehicle is not moving throughout the duration of the timer, it would be unlikely that the vehicle is currently in an on mode. In one example, the timer is approximately five minutes.

A determination is then made as to whether the vehicle is moving after the initiation of the timer and before the expiration of the timer (step 228). This determination is preferably made by the electronic processing device 38 of FIG. 1.

If it is determined that the vehicle is moving after the initiation of the timer and before the expiration of the timer, then the process proceeds to the above-referenced step 220, as the telematics unit is commanded to remain in the on mode of operation. With reference to FIG. 4, the vehicle's beginning of movement is denoted by transition stage 424, and may occur at any time during the timer period. The process then returns to step 202, as the voltage is sensed again at a new point in time for a new iteration and the process repeats.

Conversely, if it is determined that the vehicle is still not moving after the initiation of the timer and before the expiration of the timer, then the telematics unit is commanded to the off mode of operation (step 230). The telematics unit is preferably commanded to the off mode of operation by the electronic processing device 38 of FIG. 1. With reference to FIG. 4, this command is provided in accordance with stage 418, in commanding the telematics unit to the off mode of stage 404. The process then returns to step 202, as the voltage is sensed again at a new point in time for a new iteration and the process repeats.

Accordingly, methods and systems are disclosed for controlling operational modes of a telematics unit. The disclosed methods and systems allow for effective powering on and powering off of telematics units via the use of a sensed vehicle power unit voltage along with GPS data from the telematics unit. The disclosed methods and systems can be implemented in connection with various different types of telematics units, and can be implemented regardless of whether the telematics units are connected or otherwise coupled to a communications bus of the vehicle.

It will be appreciated that the disclosed systems and processes may differ from those depicted in the Figures and/or described above. For example, the communication system 10, the telematics unit 24, and/or various parts and/or components thereof may differ from those of FIG. 1 and/or described above. Similarly, certain steps of the process 200 may be unnecessary and/or may vary from those depicted in FIGS. 2-4 and described above. It will similarly be appreciated that various steps of the process 200 may occur simultaneously or in an order that is otherwise different from that depicted in FIGS. 2-4 and/or described above. It will similarly be appreciated that, while the disclosed methods and systems are described above as being used in connection with automobiles such as sedans, trucks, vans, and sports utility vehicles, the disclosed methods and systems may also be used in connection with any number of different types of vehicles, and in connection with any number of different systems thereof and environments pertaining thereto.

While at least one example has been presented in the foregoing detailed description, it should be appreciated that a vast number of variations exist. It should also be appreciated that the detailed description represents only examples, and is not intended to limit the scope, applicability, or configuration of the invention in any way. Rather, the foregoing detailed description will provide those skilled in the art with a convenient road map for implementing the examples. It should be understood that various changes can be made in the function and arrangement of elements without departing from the scope of the invention as set forth in the appended claims and the legal equivalents thereof.

What is claimed is:

1. A method for controlling a telematics unit for a vehicle having a power unit, the method comprising the steps of:
    determining whether a voltage for the power unit has decreased;
    determining whether the vehicle is moving; and
    commanding the telematics unit to an off mode if the voltage has decreased, provided further that the vehicle is not moving.

2. The method of claim 1, further comprising the step of:
    sensing a measure of the voltage via a voltage sensor of the telematics unit;
    wherein the step of determining whether the voltage has decreased comprises the step of determining whether the voltage has decreased using the sensed measure of the voltage.

3. The method of claim 1, further comprising the step of:
    obtaining position data as to a position of the vehicle via a global positioning system unit of the telematics unit;
    wherein the step of determining whether the vehicle is moving comprises the step of determining whether the vehicle is moving using the position data.

4. The method of claim 1, wherein:
    the step of determining whether the voltage has decreased comprises the step of determining whether the voltage has decreased by at least a predetermined magnitude; and
    the step of commanding the telematics unit to the off mode comprises the step of commanding the telematics unit to the off mode if the voltage has decreased by at least the predetermined magnitude and the vehicle is not moving.

5. The method of claim 1, wherein:
    the step of determining whether the voltage has decreased comprises the step of determining whether the voltage has decreased by at least a predetermined percentage; and
    the step of commanding the telematics unit to the off mode comprises the step of commanding the telematics unit to the off mode if the voltage has decreased by at least the predetermined percentage and the vehicle is not moving.

6. The method of claim 1, wherein:
    the step of determining whether the vehicle is moving comprises the step of determining whether a velocity of the vehicle is greater than a predetermined velocity threshold for longer than a predetermined amount of time; and
    the step of commanding the telematics unit to the off mode comprises the step of commanding the telematics unit to the off mode if the voltage has decreased and the velocity has not been greater than the predetermined velocity threshold for longer than the predetermined amount of time.

7. The method of claim 1, further comprising the step of maintaining the telematics unit in an on mode when the voltage has not decreased, regardless of whether the vehicle is moving.

8. The method of claim 1, further comprising the steps of:
    determining whether the voltage has increased; and
    commanding the telematics unit to an on mode if the voltage has increased.

9. The method of claim 8, wherein:
    the step of determining whether the voltage has increased comprises the step of determining whether the voltage has increased by at least a predetermined magnitude; and
    the step of commanding the telematics unit to the on mode comprises the step of commanding the telematics unit to the on mode if the voltage has increased by at least the predetermined magnitude.

10. The method of claim 8, wherein:
    the step of determining whether the voltage has increased comprises the step of determining whether the voltage has increased by at least a predetermined percentage; and
    the step of commanding the telematics unit to the on mode comprises the step of commanding the telematics unit to the on mode if the voltage has increased by at least the predetermined percentage.

11. A method for controlling a telematics unit for a vehicle having a power unit, the method comprising the steps of:
    sensing a measure of a voltage of the power unit;
    detecting a measure of movement of the vehicle;
    commanding the telematics unit to an off mode if the voltage has decreased by at least a first predetermined voltage amount and the vehicle is moving at least at a predetermined velocity for at least a predetermined amount of time as determined using the sensed measure of the voltage and the detected measure of movement; and
    commanding the telematics unit to an on mode if the voltage has increased by at least a second predetermined voltage amount as determined using the sensed measure of the voltage.

12. A telematics unit for a vehicle having a power unit, the telematics unit comprising:
    a voltage sensor configured to sense a measure of a voltage of the power unit;
    a global positioning system unit configured to obtain position data as to a position of the vehicle; and
    a processor coupled to the voltage sensor and the global positioning system unit and configured to:
        determine whether the voltage for the power unit has decreased using the sensed measure of the voltage;
        determine whether the vehicle is moving using the position data; and
        command the telematics unit to an off mode if the voltage has decreased, provided further that the vehicle is not moving.

13. The telematics unit of claim 12, wherein the processor is further configured to:
    determine whether the voltage has decreased by at least a predetermined magnitude; and
    command the telematics unit to the off mode if the voltage has decreased by at least the predetermined magnitude and the vehicle is not moving.

14. The telematics unit of claim 12, wherein the processor is further configured to:
    determine whether the voltage has decreased by at least a predetermined percentage; and
    command the telematics unit to the off mode if the voltage has decreased by at least the predetermined percentage and the vehicle is not moving.

15. The telematics unit of claim 12, wherein the processor is further configured to:
   determine whether a velocity of the vehicle is greater than a predetermined velocity threshold for shorter than a predetermined amount of time; and
   command the telematics unit to the on mode if the voltage has fluctuated and the velocity is greater than the predetermined velocity threshold for longer than the predetermined amount of time.

16. The telematics unit of claim 12, wherein the processor is configured to maintain the telematics unit in an on mode when the voltage has not decreased, regardless of whether the vehicle is moving.

17. The telematics unit of claim 12, wherein the processor is further configured to:
   determine whether the voltage has increased using the sensed measure of the voltage; and
   command the telematics unit to an on mode if the voltage has increased.

18. The telematics unit of claim 17, wherein the processor is further configured to determine that the voltage has increased if the voltage has increased by at least a predetermined magnitude.

19. The telematics unit of claim 17, wherein the processor is further configured to determine that the voltage has increased if the voltage has increased by at least a predetermined percentage.

20. The telematics unit of claim 12, further comprising:
   a housing, wherein the voltage sensor, the global positioning system unit, and the processor are all disposed within the housing.

* * * * *